United States Patent
Van Rooyen et al.

(10) Patent No.: US 12,115,973 B2
(45) Date of Patent: Oct. 15, 2024

(54) ADJUSTABLE SUSPENSION FOR A VEHICLE

(71) Applicant: TESLA, INC., Palo Alto, CA (US)

(72) Inventors: Joel Van Rooyen, San Francisco, CA (US); Brian Doorlag, San Francisco, CA (US); Paul Venhovens, San Francisco, CA (US)

(73) Assignee: Tesla, Inc., Austin, TX (US)

( * ) Notice: Subject to any disclaimer, the term of this patent is extended or adjusted under 35 U.S.C. 154(b) by 270 days.

(21) Appl. No.: 17/100,713

(22) Filed: Nov. 20, 2020

(65) Prior Publication Data

US 2021/0155228 A1     May 27, 2021

Related U.S. Application Data

(60) Provisional application No. 62/938,745, filed on Nov. 21, 2019.

(51) Int. Cl.
*B60W 30/00*     (2006.01)
*B60W 30/02*     (2012.01)
*G06F 16/9035*     (2019.01)

(52) U.S. Cl.
CPC ......... *B60W 30/02* (2013.01); *G06F 16/9035* (2019.01); *B60W 2510/22* (2013.01)

(58) Field of Classification Search
CPC ............... B60W 30/02; B60W 2510/22; G06F 16/9035; B60G 17/0165; B60G 17/0195;
(Continued)

(56) References Cited

U.S. PATENT DOCUMENTS 4,749,210 A * 6/1988 Sugasawa .......... B60G 17/0165
                                                 280/124.102
5,466,007 A * 11/1995 Smith ................ B60G 17/0155
                                                 280/5.514
(Continued)

FOREIGN PATENT DOCUMENTS

| CN | 103963593 A | * | 8/2014 | ........... B60G 17/015 |
| CN | 110304076 A | * | 10/2019 | ........... B60W 30/02 |

(Continued)

OTHER PUBLICATIONS

International Search Report and Written Opinion dated Mar. 10, 2021 in application No. PCT/US2020/061621.
(Continued)

*Primary Examiner* — Peter D Nolan
*Assistant Examiner* — Peter Y Ning
(74) *Attorney, Agent, or Firm* — Schwegman Lundberg & Woessner, P.A.

(57) ABSTRACT

A system for dynamically managing individual suspension settings for a vehicle based on a determined suspension mode is provided. Based on the user input and obtained sensor input, the system can then determine a suspension mode for a plurality of individually controllable components by specifying values or commands for each controllable component. A first mode may correspond to a lowering of the plurality of controllable. A second mode may correspond to lowering two controllable components corresponding to the rear wheels of the vehicle and raising two controllable components corresponding to front wheels of the vehicle. A third mode may correspond to a lowering of the plurality of controllable components to effectively drop the height of the vehicle to a threshold point. The system may further implement various validation processes that can validate the determined suspension mode and make further adjustment to
(Continued)

individual controllable portions based on load or ground measurements.

28 Claims, 7 Drawing Sheets

(58) Field of Classification Search
CPC ............ B60G 2204/62; B60G 2300/02; B60G 2300/04; B60G 2300/07; B60G 2300/09; B60G 2300/30; B60G 2400/60; B60G 17/0155; B60G 17/018; B60G 2400/30; B60G 2500/30; B60G 2500/32; B60G 2600/04; B60G 2600/042; B60G 2600/07; B60G 2600/20; B60Y 2400/86
See application file for complete search history.

(56) References Cited

U.S. PATENT DOCUMENTS

| | | | | |
|---|---|---|---|---|
| 9,272,599 | B1* | 3/2016 | Cook, Jr. | B60G 17/0528 |
| 11,491,838 | B2* | 11/2022 | Pereira Lemos | B60G 15/12 |
| 11,501,583 | B2* | 11/2022 | Chen | H01M 10/48 |
| 2006/0064223 | A1* | 3/2006 | Voss | B62K 25/04 |
| | | | | 701/52 |
| 2008/0272562 | A1* | 11/2008 | Sabelstrom | B60G 11/27 |
| | | | | 280/6.153 |
| 2015/0293216 | A1* | 10/2015 | O'Dea | B60W 30/02 |
| | | | | 701/23 |
| 2015/0352994 | A1* | 12/2015 | Mochizuki | B60G 17/017 |
| | | | | 298/22 C |
| 2015/0355646 | A1* | 12/2015 | Mochizuki | G05D 16/2066 |
| | | | | 298/22 C |
| 2016/0091325 | A1* | 3/2016 | Takamatsu | B60W 30/12 |
| | | | | 701/408 |
| 2016/0121905 | A1* | 5/2016 | Gillingham | B62D 5/0463 |
| | | | | 701/37 |
| 2016/0200161 | A1* | 7/2016 | Van Den Bossche | G01B 11/24 |
| | | | | 250/206 |
| 2017/0129298 | A1* | 5/2017 | Lu | B60G 17/015 |
| 2017/0136842 | A1* | 5/2017 | Anderson | B60K 35/00 |
| 2017/0168500 | A1* | 6/2017 | Bradley | G01C 21/3822 |
| 2017/0197679 | A1* | 7/2017 | Scaringe | B60K 1/02 |
| 2018/0141543 | A1* | 5/2018 | Krosschell | B60G 17/0195 |
| 2020/0192403 | A1* | 6/2020 | Silver | G01C 21/3602 |
| 2020/0384980 | A1* | 12/2020 | Yu | G05D 1/0088 |
| 2021/0034886 | A1* | 2/2021 | Murray | B60W 60/001 |
| 2023/0339558 | A1* | 10/2023 | King | B62D 59/04 |

FOREIGN PATENT DOCUMENTS

| | | | |
|---|---|---|---|
| CN | 106042815 | 11/2020 | |
| CN | 114829169 A | 7/2022 | |
| DE | 102006060514 | 6/2008 | |
| DE | 102015003589 | 10/2015 | |
| DE | 102016213683 | 2/2018 | |
| DE | 102016213683 A1 * | 2/2018 | ............ B62K 25/30 |
| DE | 102017111054 | 11/2018 | |
| DE | 102017111054 A1 * | 11/2018 | ......... B60G 17/0165 |
| EP | 3 047 987 | 7/2016 | |
| EP | 3047987 A2 * | 7/2016 | ......... B60G 17/0161 |
| EP | 3138706 A1 * | 3/2017 | ......... B60G 17/0164 |
| EP | 3138707 A1 * | 3/2017 | .......... B60G 17/019 |
| EP | 3626485 A1 * | 3/2020 | .......... B60G 11/265 |
| EP | 4061650 A1 | 9/2022 | |
| GB | 2292916 A | 3/1996 | |
| GB | 2567741 | 4/2019 | |
| GB | 2567741 A * | 4/2019 | .......... B60G 17/017 |
| JP | 2005119438 | 5/2005 | |
| JP | 2010284982 | 12/2010 | |
| WO | WO 13/158015 | 10/2013 | |
| WO | WO-2015153811 A1 * | 10/2015 | ......... B60G 17/0195 |
| WO | WO-2016005385 A1 | 1/2016 | |

OTHER PUBLICATIONS

"Japanese Application Serial No. 2022-529611, Notification of Reasons for Rejection mailed Apr. 2, 2024", W English Translation, 5 pgs.
"European Application Serial No. 20828175.8, Communication Pursuant to Article 94(3) EPC mailed Sep. 14, 2023", 9 pgs.
"Japanese Application Serial No. 2022-529611, Response filed Jun. 27, 2024 to Notification of Reasons for Rejection mailed Apr. 2, 2024", W English Claims, 16 pgs.
"European Application Serial No. 20828175.8, Response filed Jan. 23, 2024 to Communication Pursuant to Article 94(3) EPC mailed Sep. 14, 2023", 56 pgs.
"European Application Serial No. 20828175.8, Response to Communication pursuant to Rules 161(1) and 162 EPC filed Jan. 9, 2023", 57 pgs.
"European Application Serial No. 20828175.8, Communication Pursuant to Article 94(3) EPC mailed Jun. 3, 2024", 5 pgs.

* cited by examiner

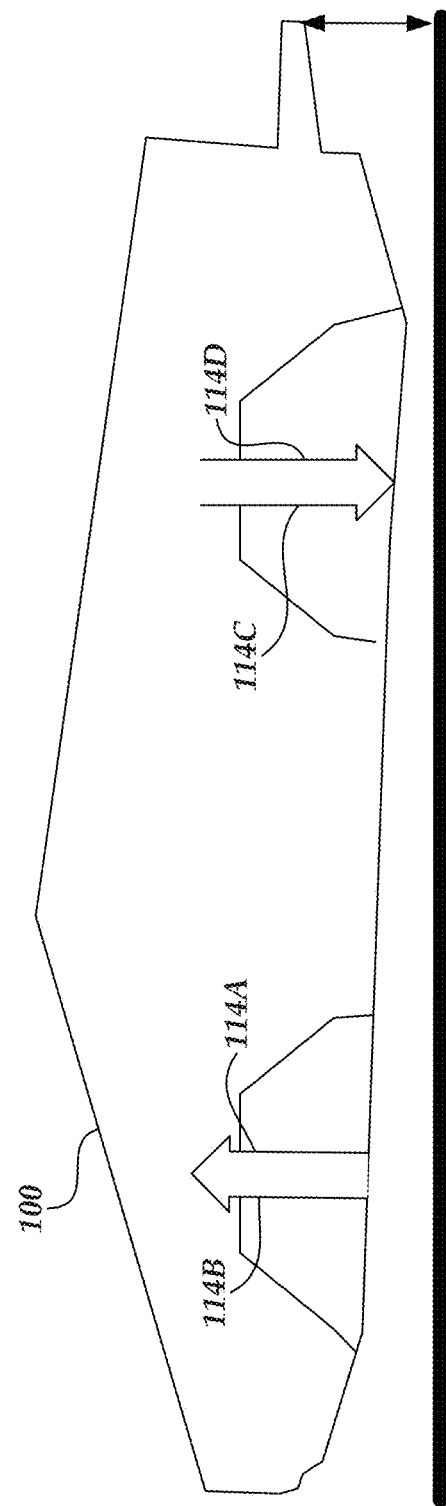

ADJUSTABLE SUSPENSION FOR A VEHICLE

CROSS-REFERENCE TO PRIOR APPLICATIONS

This application claims priority to U.S. Prov. App. No. 62/938,745 titled "ADJUSTABLE SUSPENSION FOR A VEHICLE" and filed on Nov. 21, 2019, the disclosures of which are hereby incorporated herein by reference in their entirety.

BACKGROUND

Generally described, vehicles, such as trucks, sport utility vehicles, sedans, or multi-function or crossover vehicles, may be utilized by a driver/user to implement a variety of functions or in a variety of environmental conditions. For example, a truck may have a bed that allows for the placement of various items in the bed by the users. Such items can be of various sizes, masses and have different mechanisms for being loaded and unloaded on the truck. For example, a wheeled vehicle, such as a scooter or motorcycle, can be loaded and unloaded on a truck via rolling on ramps. In another example, cargo may need to loaded and unloaded utilizing tools and gravity.

BRIEF DESCRIPTION OF THE DRAWINGS

FIGS. 3A-3C are block diagrams depicting the implementation of different suspension modes including the modification of individual controllable portions in accordance with illustrative embodiments of the present application.

DETAILED DESCRIPTION

Figure 1:
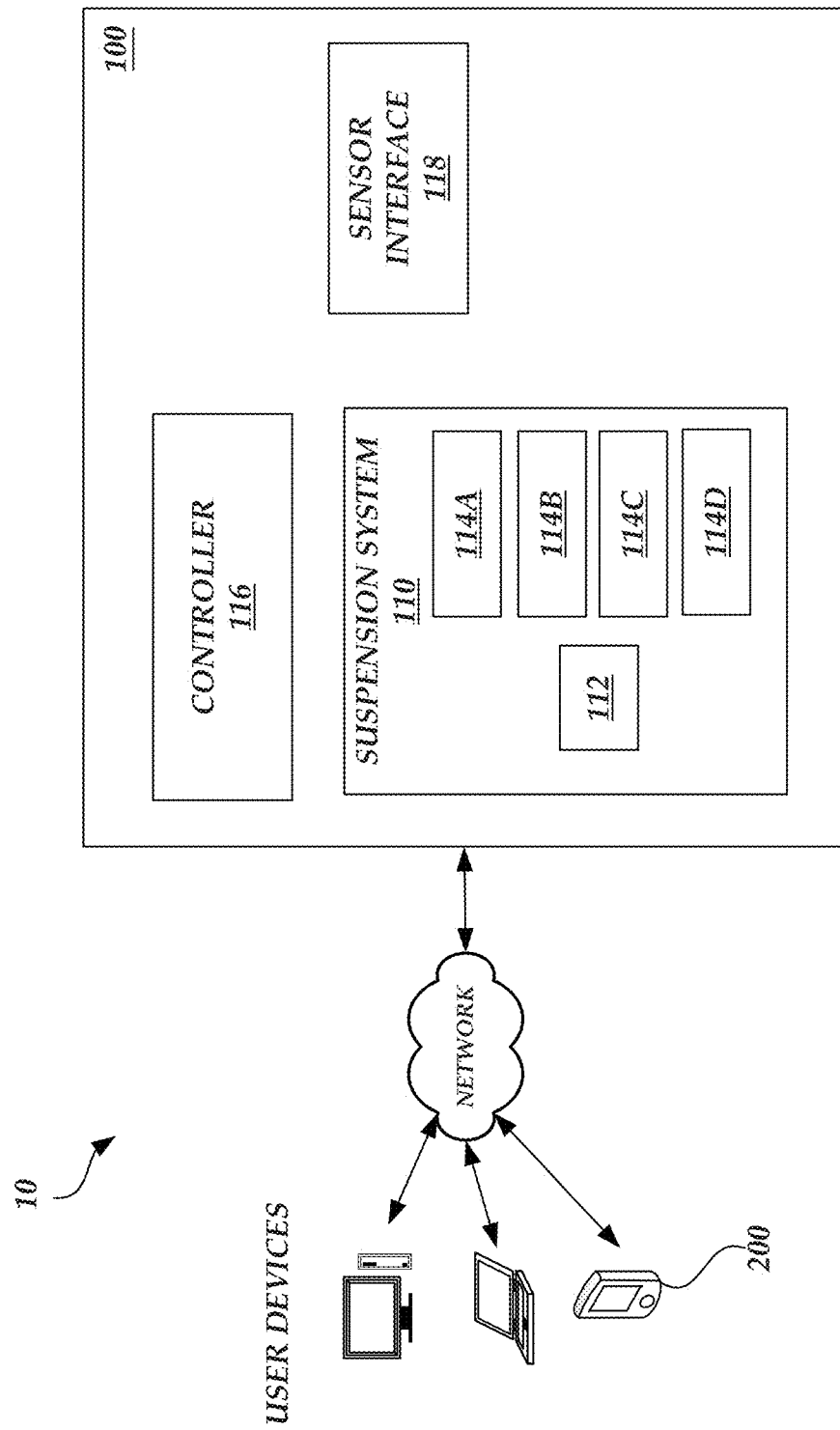
FIG. 1 is a block diagram depicting a system for managing vehicle suspension in accordance with illustrative embodiments of the present application.

Generally described, aspects of the present application correspond to an adjustable suspension system. More specifically, one or more aspects of the present application correspond to a system for dynamically managing individual suspension settings for a vehicle based on a determined suspension mode. Illustratively, the system obtains user input regarding a desired or specific suspension mode. For example, a user may select a mode via a user interface presented with a vehicle or via a separate interface generated on a mobile device in communication with the vehicle. The system can then obtain (or continuously obtains) sensor inputs that corresponds to measures related to, or attributed to, the vehicle or an environment around the vehicle including current velocity, location, ground clearance measurements, vehicle status, historical information regarding previous measurements, and the like.

Based on the user input and obtained sensor input, the system can then determine a suspension mode. Illustratively, a suspension system includes a plurality of individually controllable components, such as bellows or struts, by specifying values or commands for each controllable component. For example, a vehicle may have four individually controllable components corresponding to a suspension component located approximate to the vehicle wheels. In accordance with aspects of the present application, a determined suspension mode includes a specification of individual values or changes in values for the plurality of controllable components, such as raising, lowering or maintain a current setting for the controllable component. By way of illustrative example, a first mode (e.g., a dump mode) may correspond to a lowering of the plurality of controllable components to effectively drop the height of the vehicle to a lowest point. In another example, a second mode (e.g., ramp mode) may correspond to lowering two controllable components corresponding to the rear wheels of the vehicle and raising two controllable components corresponding to front wheels of the vehicle to achieve a particular angle between a rear edge of the vehicle with the ground. In yet another example, a third mode (e.g., nominal mode), may correspond to a lowering of the plurality of controllable components to effectively drop the height of the vehicle to a threshold point selected for movement of the vehicle in certain types of roads/conditions. In a further example, a fourth mode (e.g., level mode) may correspond to picking a selected height for the vehicle and then independently adjusting the four controllable portions so that the vehicle is substantially level. This may include one or more controllable portions may be raised or lowered, especially in environments in which the ground is uneven.

The system may further implement various validation processes that can validate the determined suspension mode. For example, the system can be configured with various processing rules that can consider whether sensor data, such as velocity, vehicle status (e.g., door open, tailgate open, etc.) prohibit the determine suspension mode. In another example, the system can obtain validation or confirmation from a user or system administrator that present secondary or confirmatory authority to modify the suspension settings. The system can then transmit or otherwise cause the modifications to vehicle settings, such as causing the change in the controllable components or other modification to the vehicle operation, such as preventing switching to driving, activating breaks, activating cameras, and the like.

Although aspects of the present application are described with regard to vehicles such as trucks, specific suspension systems, values for suspension system values (e.g., values for controllable components), and suspension modes, one skilled in the art will appreciate that reference to these examples are illustrative in nature and should not be construed as limiting.

As described above, vehicles have some form suspension system. However, implementation of vehicle suspension systems height adjustment beyond typical operating ranges (e.g., a defined air suspension operating range) may damage various aspects of the vehicle, such as chassis, drive units, battery, doors, facias, etc. This is further challenged by potential environmental conditions, such as uneven terrain or obstructions, such as curbs. For example, a vehicle with traditional height adjustment mechanisms may be lowered in a manner that may cause the lower portions of the vehicle to make contact with obstructions, such as rocks, curbs, etc. Further, operating a vehicle while height adjustment systems are in a lower position may cause damage from striking objects in the road. Accordingly, traditional height adjustment systems are inefficient in adapting to different types of activities.

With reference to an illustrative example, a truck (e.g., vehicle) having an adjustable suspension system that can raise and lower the truck body. In this embodiment each wheel may be individually raised or lowered a desired amount by increasing or decreasing the compressed air within movable bellows or struts attached to the wheels and frame. For example, the rear two bellows may be electronically controllable by a central system that connects to an air pump or compressor.

In accordance with a first illustrative example, corresponding to a ramp mode, when the air is reduced in the bellows attached to the rear two wheels the truck bed will lower to a lower positon in the rear than in the front. This may allow the bed of the truck to be angled so that a ramp or other device attached to the rear liftgate of the truck may be at a better position or angle for moving components up and down the ramp. For example, the breakover angle of the ramp, which is the angle formed where the ramp meets the truck bed, may be reduced so a motorcycle doesn't bottom out when entering the truck. As one example, the breakover angle without lowering the truck may be 45-55 degrees. However, when the truck is angled by lowering the rear portion, the breakover angle for the same ramp may be only 20-30 degrees.

Accordingly, in ramp mode, the suspension of the truck may be adjusted to that the front of the truck is raised by 80 mm and the rear of the truck is lowered by 70 mm. Of course, the truck may be raised or lowered by other amounts and still be within the spirit of the invention. For example, the suspension may be raised or lowered by 5, 10, 15, 20, 25, 30, 35, 40, 45, 50, 55, 60, 65, 70, 75, 80, 85, 90, 95, 100, 125, 150, 200 or more millimeters. This may create an angle of 2, 3, 4, 5 or more degrees depending on the length of the truck. Angling the truck bed by a few degrees allows a ramp attached to the truck bed to be more easily navigated by a motorcycle or all-terrain vehicle, for example. In addition, a shorter ramp may be used to connect from the ground to the truck bed if the distance from the rear of the truck to the ground is reduced.

In another embodiment, the truck may be placed into "dump mode" where the truck is lowered at all four tires to bring the truck bed closer to the ground, such as a maximum amount, so that it's easier to reach into the truck and move out any materials that need to be removed from the truck bed. In a further embodiment, the truck may be put into a level mode may correspond to picking a selected height for the truck and then independently adjusting the four controllable portions so that the truck is substantially level. This may include one or more controllable portions may be raised or lowered, especially in environments in which the ground is uneven. This may be desirable for certain types of activities, such as camping, tailgating, etc.

Turning now to FIG. 1, an illustrative system 10 for managing vehicle suspensions will be described. The system 10 includes a vehicle 100 that implements a dynamically controllable suspension system 110. The dynamically controllable suspension system 110 can include a controller 112 that can receive commands or signals and that causes the modification of individual controllable portions 114. As illustrated in FIG. 1, the vehicle 100 is associated with a plurality of individual controllable portions 114A, 114B, 114C and 114D that may correspond to suspension components associated with the four wheels of vehicle. As described above, in one embodiment, the individual controllable portions 114 of the controllable suspension system 110 includes bellows or struts that can be controlled by increasing or decreasing air. Accordingly, in this embodiment, the controller 112 can receive signals or commands from a component that can be utilized to operate an air pump or compressor, or otherwise release air. In other embodiments, different types of suspension systems can include mechanical or electro-mechanical suspension systems with individual controllable portions 114. Additionally, although the vehicle 100 is illustrate with regard to four individual controllable portions 114, one skilled in the art will appreciate that the vehicle can include any number of controllable portions corresponds to achieve different adjustments of the vehicle in the spirit described herein.

The vehicle 100 further includes a controller 116 for processing various inputs to determine a suspension mode for the vehicle, determine various values/commands for individual controllable portions 114 and cause implementation of changes in the values. Illustrative components of the controller 116 will be described with regard to FIG. 2B. The vehicle 100 further includes a sensor interface 118 for obtaining sensor input related to operational status or environment status of the vehicle. Illustratively, the sensor interface 118 can correspond to receiving inputs from sensors or interfaces and processing functionality that may be provided on the vehicle for general operation of the vehicle, such as velocity and acceleration detectors, location sensor (e.g., GPS), cameras, door ajar sensors, tailgate sensors, vehicle occupant sensors, and the like. The sensor interface 118 can also include additional sensors that may not be otherwise available on the vehicle 100 in accordance with illustrative embodiment, such as curb detection sensor, road incline detection, etc. Accordingly, sensor interface 118 is representative of interface for a plurality of sensors that may include a number of additional components or interfaces.

With continued reference to FIG. 1, the system 10 can further include one or more client devices 200 for obtaining user inputs. Client devices 200 may include any number of different computing devices capable of communicating with the global access points 106. For example, individual client devices 200 may correspond to a laptop or tablet computer, personal computer, wearable computer, server, personal digital assistant (PDA), hybrid PDA/mobile phone, mobile phone, electronic book reader, set-top box, camera, digital media player, and the like. In some instances, client devices 200 are operated by end users as described herein. The components of a client device 200 will be described with regard to FIG. 2A.

The client devices 200 and vehicle 100 may communicate via a communication network 130, which may be any wired network, wireless network, or combination thereof. Such network can include, but are not limited to short range radio networks, cellular networks, satellite networks, and the like. Protocols and components for communicating via the other aforementioned types of communication networks are well known to those skilled in the art of computer communications and thus, need not be described in more detail herein.

Figure 2A:
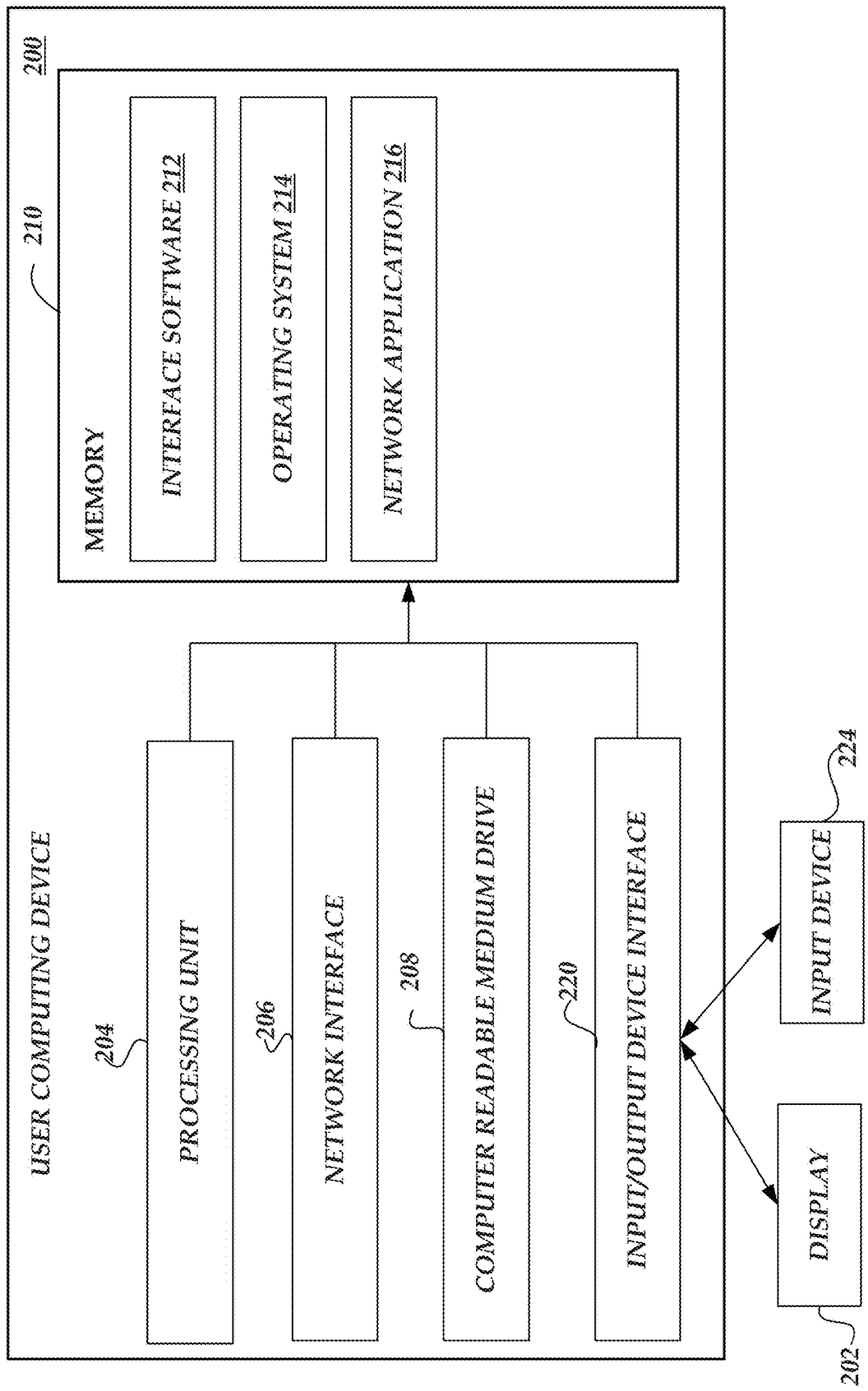
FIG. 2A is a block diagram depicting illustrative components of a client device for providing inputs for dynamically managing vehicle suspension in accordance with illustrative embodiments of the present application.

FIG. 2A depicts one embodiment of an architecture of an illustrative user computing device 200 that can generate suspension mode requests, validate transitions in suspension mode and enter user preference in accordance with various aspects of the present application. The general architecture of the user computing device 200 depicted in FIG. 2A includes an arrangement of computer hardware and software components that may be used to implement aspects of the present disclosure. As illustrated, the user computing device 200 includes a processing unit 204, a network interface 206, a computer readable medium drive 208, an input/output device interface 220, an optional display 202, and an input device 224, all of which may communicate with one another by way of a communication bus.

The network interface 206 may provide connectivity to one or more networks or computing systems, such as the vehicle 100 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the user computing device 104 may include more (or fewer) components than those shown in FIG. 2A.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 104. The memory 210 may further include computer program instructions and other information for implementing aspects of the present disclosure. For example, in one embodiment, the memory 210 includes a network application 216, such as browser application or software application, for accessing content and communicating with vehicle 100 for purposes of selecting or modifying suspension mode requests.

Figure 2B:
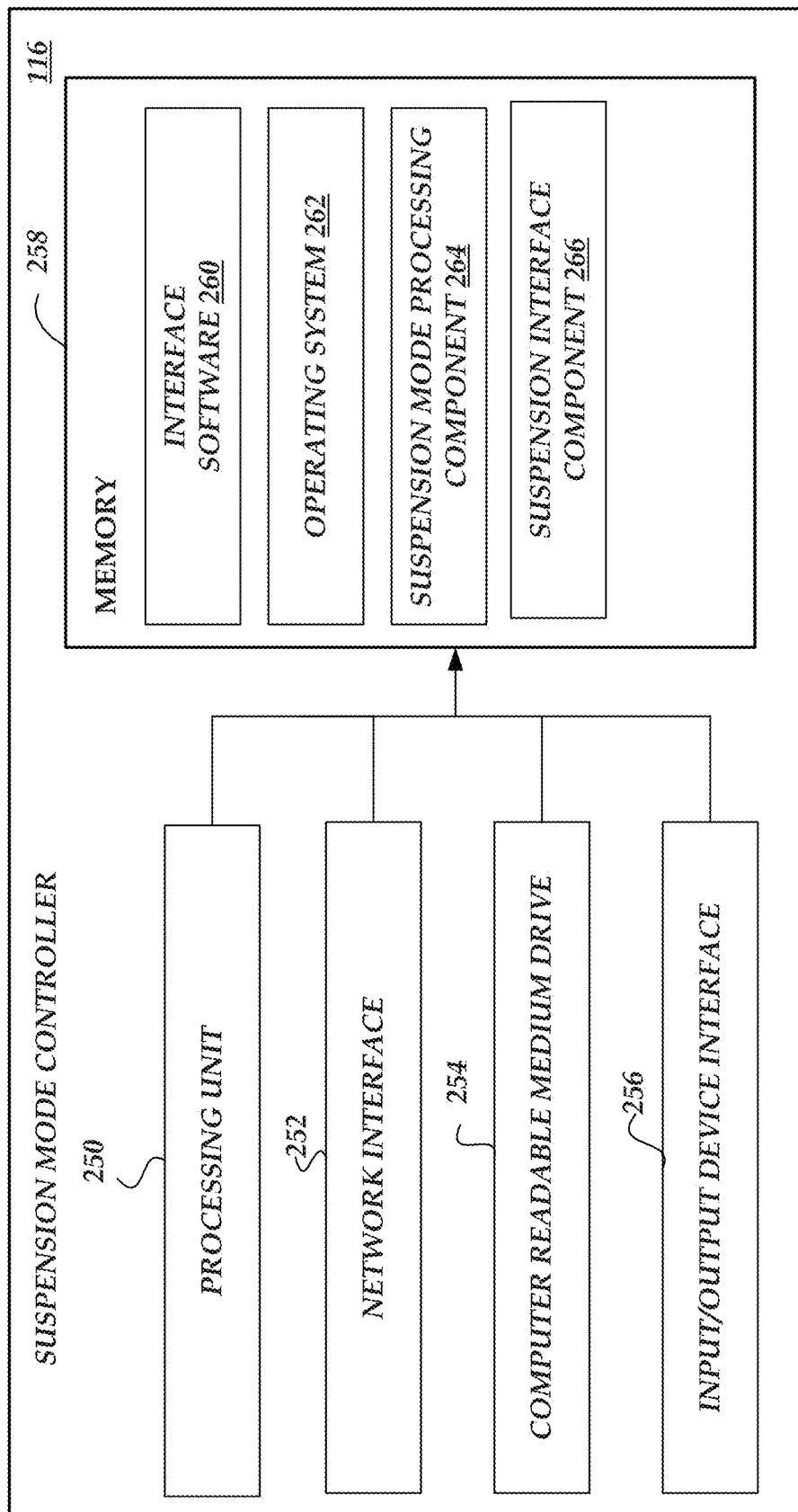
FIG. 2B is a block diagram depicting illustrative components of a controller for dynamically managing a vehicle suspension in accordance with illustrative embodiments of the present application.

FIG. 2B depicts one embodiment of an architecture of a controller 116 for implementing the dynamic suspension management system described herein. The general architecture of the controller 116 depicted in FIG. 2B includes an arrangement of computer hardware and software components that may be used to implement aspects of the present disclosure. As illustrated, the controller 116 includes a processing unit 250, a network interface 252, a computer readable medium drive 254, and an input/output device interface 256, all of which may communicate with one another by way of a communication bus. The components of the controller 116 may be physical hardware components or implemented in a virtualized environment.

The network interface 252 may provide connectivity to one or more networks or computing systems, such as the user computing device 200. The processing unit 250 may thus receive information and instructions from other computing systems or services via a network. The processing unit 250 may also communicate to and from memory 258 and further provide output information for an optional display via the input/output device interface 256. In some embodiments, the controller 116 may include more (or fewer) components than those shown in FIG. 2B.

The memory 258 may include computer program instructions that the processing unit 250 executes in order to implement one or more embodiments. The memory 258 generally includes RAM, ROM, or other persistent or non-transitory memory. The memory 258 may store an operating system 262 that provides computer program instructions for use by the processing unit 250 in the general administration and operation of the controller 116. The memory 258 may further include computer program instructions and other information for implementing aspects of the present disclosure. For example, in one embodiment, the memory 258 includes interface software 260 for receiving and processing suspension mode requests from the user computing device 200 or other requests. The interface software 260 may also be configured to receive sensor data from the sensor interface 118. Memory 258 includes a suspension mode processing component 264 for implementing one or more suspension mode algorithms for determining appropriate suspension modes for a vehicle 100 and corresponding settings/values for controllable components 114 of the suspension system 110. The memory 258 can further include a suspension interface component 266 for interface with the suspension system 110 and controller 112 to cause modification of the controllable components according to a selected suspension mode.

Figure 3A:
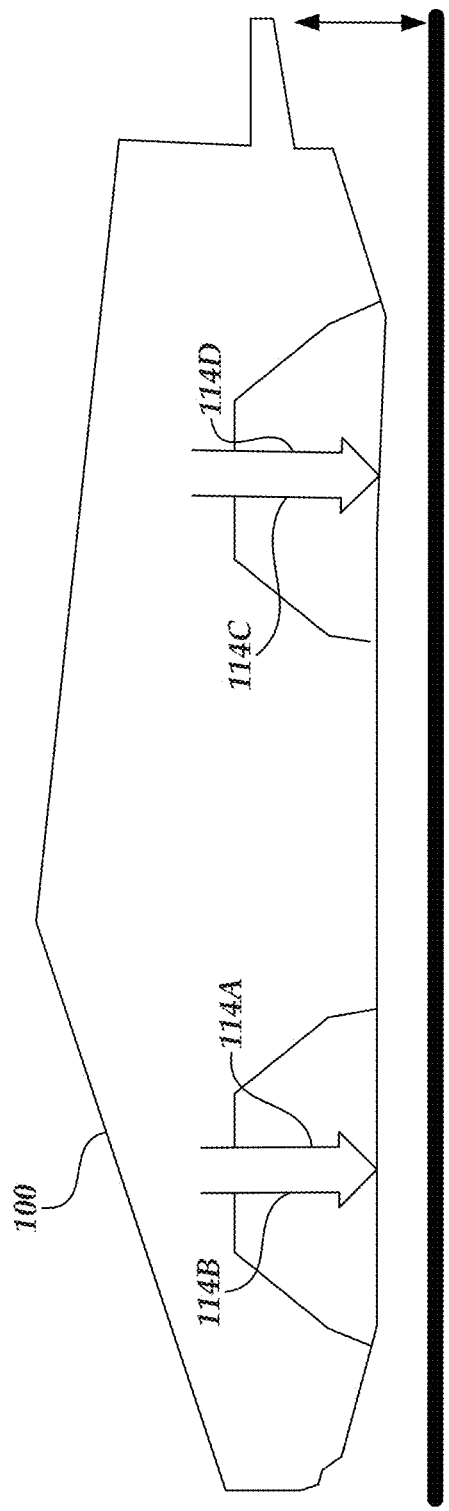
Figure 3B:
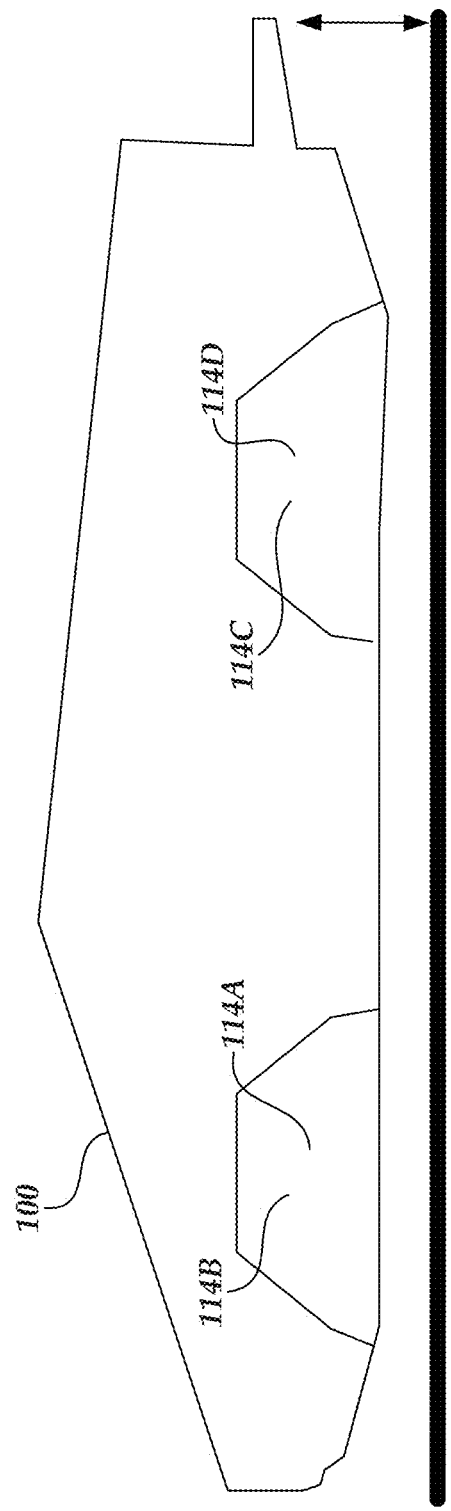

Turning now to FIGS. 3A-3C, illustrative examples of different suspension modes will be described. With reference to FIG. 3A, a first mode, generally referred to as dump mode, will be described. In this mode, the suspension controller 116 can look to modify the controllable portions 114 of the suspension system 110 to a lowest possible value for each of the four controllable portions 114A, 114B, 114C, 114D. The lowest possible value can correspond to a threshold value that is set as the "lowest" value even if the controllable portions may physically be able to achieve a lower value or position. In this example, the four controllable portions 114A, 114B, 114C, 114D are assumed to be able to achieve the same height from a contact surface uniformly. In an alternative embodiment, the suspension controller 116 may individually adjust one or more controllable portions if the contact surface is determined to be uneven based on sensor inputs in the vehicle 100, historical data from previous interactions at the location, or knowledge information provided to the suspension controller 116. In still another embodiment, the controller 116 may further individually adjust one or more controllable portions based on dynamics of the load that either causes the vehicle to shift or in which the user has specified for the vehicle 100 to shift during the dump mode (e.g., balancing out an unbalanced load). As will be described, in the dump mode, the controller 116 may further check to ensure that doors in the vehicle are not open and subject to damage prior to entering into dump mode. Likewise, the controller 116 can further cause the vehicle to prevent shifting into neutral or a drive/reverse position so that the vehicle is not capable of being operated in dump mode.

With reference to FIG. 3B, a second mode, generally referred to as nominal mode, will be described. In this mode, the suspension controller 116 can look to modify the controllable portions 114 of the suspension system 110 to a default set of values for each of the four controllable portions 114A, 114B, 114C, 114D configured for operation of the vehicle on standard surfaces. The default value can correspond to a manufacturing set value that can incorporate a characterized optimal position for the vehicle 100 based on aerodynamics, safety, and the like. In this example, the four controllable portions 114A, 114B, 114C, 114D are assumed to be able to achieve the same height from a contact surface uniformly. The nominal mode operation may further be dynamically modified based on operational conditions of the vehicle, such as energy consumption, road conditions, and the like. In still another embodiment, the controller 116 may further individually adjust one or more controllable portions based on dynamics of the load that either causes the vehicle to shift or in which the user has specified for the vehicle 100 to shift during the nominal mode (e.g., balancing out an unbalanced load).

With reference to FIG. 3C, a third mode, generally referred to as ramp mode, will be described. In this mode, the suspension controller 116 can look to modify the controllable portions 114 of the suspension system 110 corresponding to rear of the vehicle 100 to a lower value for two of the four controllable portions 114C, 114D while raising to a higher value the remaining two of the four controllable portions 114A, 114B, corresponding to the front of the vehicle. The lowest and highest or lower and higher possible value can correspond to a threshold values that are set even if the controllable portions may physically be able to achieve a lower or higher value or position. In an alternative embodiment, the suspension controller 116 may individually adjust one or more controllable portions if the contact surface is determined to be uneven based on sensor inputs in the vehicle 100, historical data from previous interactions at the location, or knowledge information provided to the suspension controller 116. In still another embodiment, the controller 116 may further individually adjust one or more controllable portions based on dynamics of the load that either causes the vehicle to shift or in which the user has specified for the vehicle 100 to shift during the ramp mode (e.g., balancing out an unbalanced load). As will be described, in the ramp mode, the controller 116 may further check to ensure that doors in the vehicle are not open and subject to damage prior to entering into dump mode. Likewise, the controller 116 can further cause the vehicle to prevent shifting into neutral or a drive/reverse position so that the vehicle is not capable of being operated in ramp mode. Still further, the controller can also cause the rear controllable portions 114C, 114D to further adjust upward after a load is detected to keep the load from unintentionally slide off the vehicle 100 after loading is complete.

Figure 4:
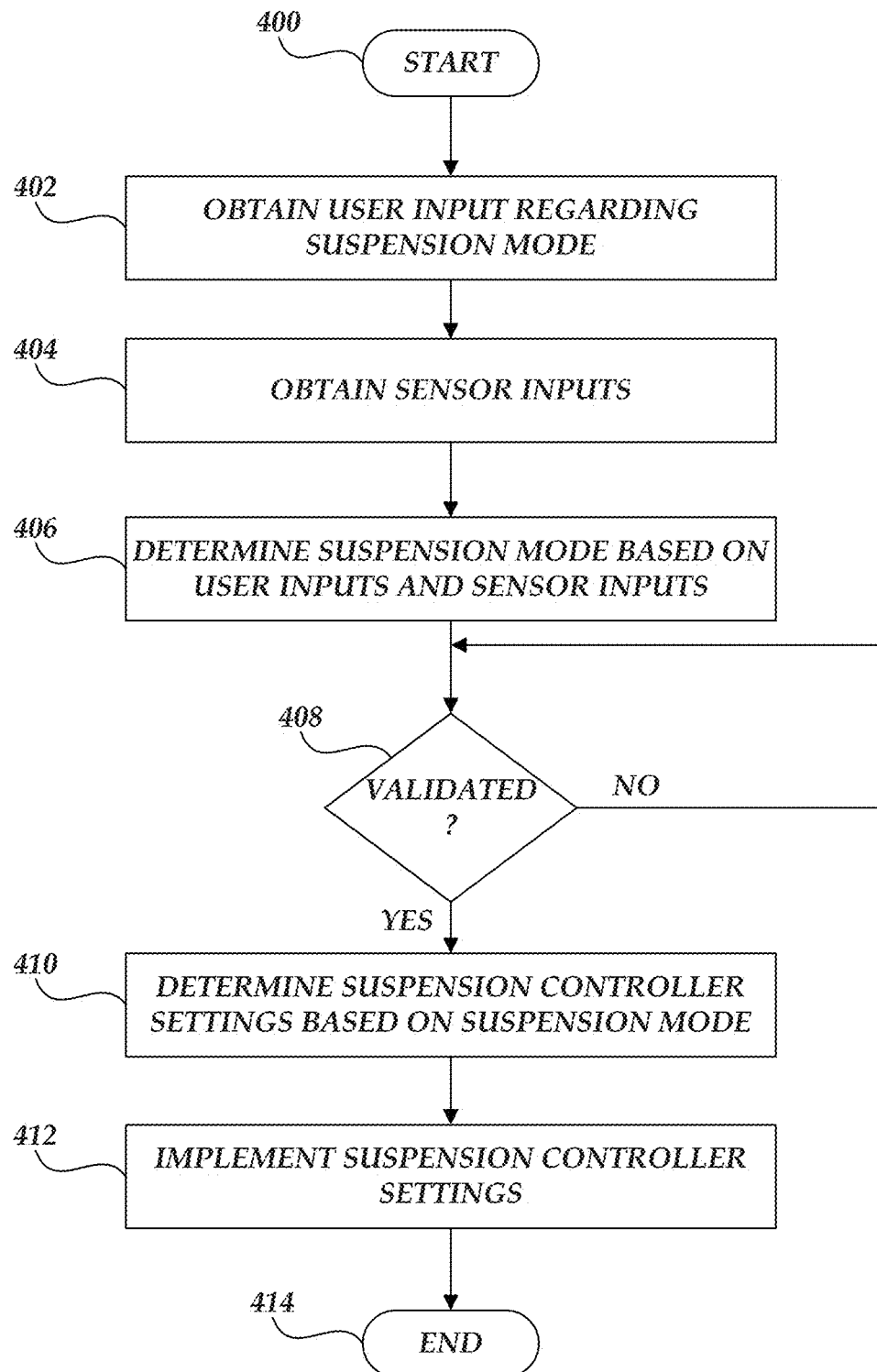
FIG. 4 is a flow diagram corresponding to a routine implemented by a controller for dynamically managing vehicle suspension in accordance with an illustrative embodiment of the present application.

Turning now to FIG. 4, a routine 400 implemented to managing dynamic suspension modes will be described. Routine 400 may illustratively be implemented by controller 116, or mobile device 200 or any other computing device configured to manage suspension settings on a vehicle. At block 402, the controller 116 obtain user input regarding a suspension mode. Illustratively, the user input regarding the suspension can be accessed via graphical interface provided in the vehicle 100 or the mobile device 200. The user input may be manually specified such as by selection of a specified suspension mode or designation of an activity that corresponds or is predefined with a suspension mode (e.g., selection of "loading an item" is correlated to ramp mode or stating a desired action via a microphone input). Alternatively, the user input may be automatically specified based on profile information or historical information and automatically received by the controller 116. For example, a user may specify, such as via social media ("Moving my older recliner") or a calendaring application, that they will be traveling with a load to a destination that causes the mobile device 200 or vehicle 100 to determine dump mode when the vehicle 100 stops movement. In some embodiments, user input may not be received, and the controller will solely receive sensor input as described below.

At block 404, the controller 116 obtains one or more sensor inputs from the sensor interface 118 (or directly from the vehicle 100). As described above, the sensor inputs can correspond to inputs from sensors or interfaces and processing functionality that may be provided on the vehicle for general operation of the vehicle, such as velocity and acceleration detectors, location sensor (e.g., GPS), cameras, door ajar sensors, tailgate sensors, vehicle occupant sensors, operational status (drive, reverse, neutral, park, etc.) and the like. The sensors can include additional sensors that may not be otherwise available on the vehicle 100 in accordance with illustrative embodiment, such as curb detection sensor, road incline detection, etc. Accordingly, sensor interface 118 is representative of interface for a plurality of sensors that may include a number of additional components or interfaces.

At block 406, the controller 406 determines suspension mode based on a combination of user inputs and sensor inputs. In one embodiment, the determination of a suspension mode may default to a particular mode selected by the user input, which can then be validated by sensor input as will be described below. In another embodiment, the determination of a suspension mode may be based on matching sensor input values, such as velocity and location, with predefined value ranges for different suspension modes. The sensor input values may have a higher priority over user input or in the absence of user input. If user input and sensor inputs are received, the controller 116 can associate priority to the inputs for determination of a suspension mode, such as prioritizing user selected suspension modes and suspension mode selections based on location over other selection criteria, such as velocity. In still other embodiments, the determination of a suspension can correspond to a selection criteria or rules in which two or more applicable suspension modes may be available and the controller 116 can utilize sensor input values to select from various suspension modes. Still further, in an additional embodiment, the controller 116 can utilize machine learning techniques in which a wide set of inputs, such as user speech ("load the bike" "drop the truck"), vehicle status, mobile device applications, location information, occupant identifications, etc. can be used as input and a selected suspension mode can be generated based on a trained machine learning algorithm.

At decision block 408, a test is conducted to determine whether the controller 116 has validated the selected suspension mode. Illustratively, the controller 116 can utilize the user inputs and sensor inputs to determine the suspension mode (block 406) and to validate a selected suspension mode. In one example, a user may be prompted via an interface, such as graphical interface or audible interface, to confirm the selection of suspension mode transition. This may be required if the controller 116 has selected a suspension mode without receiving user input to initiate the transition or if the controller 116 has selected a different suspension mode than was specified by the user input. In another example, the controller 116 can use sensor input values and rules to determine when a selected suspension mode would be prohibited As described above, in one embodiment, a selected transition to ramp mode or dump mode may be prohibited or delayed in sensor values indicate velocity above a threshold, location values indicate obstacles or potential damage may be possible, vehicle status indicator(s) indicate the vehicle is set to an operational mode (e.g., reverse), a door is open or a driver/passenger is present in the vehicle 100, and the like. The validation rules may be specified as default, such as a door ajar sensor prohibited transition to dump mode. Other validation rules may be set by the user, such as determining geographic limitations or preferred velocity ranges for suspension modes (e.g., transitioning to a nominal operating suspension mode).

If the transition to a suspension mode cannot be validated, the routine 400 does not proceed and can illustratively generate notifications or errors regarding the information surrounding the failed validation (e.g., a user interface indicating a door is detected ajar). If the transition to a suspension mode can be validated or there is otherwise no validation rules that are applicable, at block 410, the controller 116 determines suspension controller settings for the controllable portions 114 of the suspension system 112. As described above, described above, in one embodiment, the individual controllable portions 114 of the controllable suspension system 110 includes bellows or struts that can be controlled by increasing or decreasing air. Accordingly, in this embodiment, the controller 112 can receive signals or commands from a component that can be utilized to operate an air pump or compressor, or otherwise release air. In other embodiments, different types of suspension systems can include mechanical or electro-mechanical suspension systems with individual controllable portions 114. As described in the illustrative examples, the controller 116 can adjust individual values for the controllable portions based on uneven surface conditions, uneven loads, and the like. The adjustments in controllable portion 114 may be based on a comparison of terrain along the length of the vehicle 100 or the width of the width vehicle. Further, in other examples, if individual controllable portions 114 have different tolerance ranges or variances in how a command is implemented, especially over time, the controller 116 can develop profiles regarding the controllable portions (e.g., measured tolerances) and make appropriate adjustments to individual commands based on the profile information.

In a first mode, generally referred to as dump mode, the suspension controller 116 can look to modify the controllable portions 114 of the suspension system 110 to a lowest possible value for each of the controllable portions 114. In this mode, the controllable portions 114. In an alternative embodiment, the suspension controller 116 may individually adjust one or more controllable portions if the contact surface is determined to be uneven based on sensor inputs in the vehicle 100, historical data from previous interactions at the location, or knowledge information provided to the suspension controller 116. In still another embodiment, the controller 116 may further individually adjust one or more controllable portions based on dynamics of the load that either causes the vehicle to shift or in which the user has specified for the vehicle 100 to shift during the dump mode (e.g., balancing out an unbalanced load).

In a second mode, generally referred to as nominal mode, the controller 116 can look to modify the controllable portions 114 of the suspension system 110 to a default set of values for each of the controllable portions 114. The default value can correspond to a manufacturing set value that can incorporate a characterized optimal position for the vehicle 100 based on aerodynamics, safety, and the like. In this example, the controllable portions 114 are assumed to be able to achieve the same height from a contact surface uniformly. The nominal mode operation may further be dynamically modified based on operational conditions of the vehicle, such as energy consumption, road conditions, and the like. In still another embodiment, the controller 116 may further individually adjust one or more controllable portions based on dynamics of the load that either causes the vehicle to shift or in which the user has specified for the vehicle 100 to shift during the nominal mode (e.g., balancing out an unbalanced load).

In a third mode, generally referred to as ramp mode, the controller 116 can look to modify the suspension system 110 to a lower value for the portion of the controllable portions 114 corresponding to the rear of the vehicle while raising to a higher value the remaining portion of the controllable portions 114 corresponding to the front of the vehicle. The lowest and highest or lower and higher possible value can correspond to a threshold values that are set even if the controllable portions may physically be able to achieve a lower or higher value or position. In an alternative embodiment, the suspension controller 116 may individually adjust one or more controllable portions if the contact surface is determined to be uneven based on sensor inputs in the vehicle 100, historical data from previous interactions at the location, or knowledge information provided to the suspension controller 116. In still another embodiment, the controller 116 may further individually adjust one or more controllable portions based on dynamics of the load that either causes the vehicle to shift or in which the user has specified for the vehicle 100 to shift during the ramp mode (e.g., balancing out an unbalanced load).

In some embodiments, the controller 116 can also determine additional settings of the vehicle 100 that should be modified in accordance with the selected suspension mode. For example, in dump mode or ramp mode, the vehicle 100 should remain in a park operational mode and the emergency brake may be automatically activated. The vehicle 100 may also be prohibited from transitioning to different operational mode (e.g., drive, reverse, neutral). Additionally, it should be realized that while in some embodiments the suspension is raised or lowered using compressed air, other types of systems may also be used, including an electromechanical actuator to control the height of the vehicle adjacent to the four wheels.

At block 412, the controller 116 transmits settings or commands to cause the changes in the controllable portions 114 of the suspension system 110. The controller 116 can transmit commands with values that are translated by the controller 112 or the specific commands/signals utilized by the controllable portion 114. At block 414, the routine 400 terminates.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for managing vehicle suspension systems comprising:
   obtaining user input regarding selection of a suspension mode for the suspension system of a vehicle;
   obtaining a plurality of sensor values for the vehicle, the sensor values associated with one or more of vehicle status and environmental measurements associated with the vehicle;
   determining a suspension mode for the suspension system based on the on the user input and the plurality of sensor values for the values, wherein the determined suspension mode is different than the suspension mode selected by the user input;
   validating the determined suspension mode, wherein validating the determined suspension mode includes applying a rule processing to a sensor value associated with environmental measurements according to the determined suspension mode;
   wherein the sensor values associated with environmental measurements comprise sensor values associated with presence of an obstruction;
   determining a plurality of individual modification values to four independent controllable portions of the suspension system based on the determined suspension mode, wherein each of the four independent controllable portions correspond to a wheel position of the vehicle and wherein each of the four independent controllable portions can raise or lower a portion of the vehicle and are associated with a position value; and
   causing implementation of modification of the plurality of individual modifications to the four independent controllable portions responsive to the determined modification values, wherein respective modifications to the four independent controllable portions individually modify the position value of the controllable portion.

2. The method as recited in claim 1, wherein obtaining user input regarding selection of a suspension mode for the suspension system of a vehicle includes obtaining the user input from an interface control provided within the vehicle.

3. The method as recited in claim 2, wherein the interface control corresponds to a graphical interface for obtaining user input.

4. The method as recited in claim 2, wherein the interface control corresponds to an audible interface for obtaining user input.

5. The method as recited in claim 1, wherein obtaining user input regarding selection of a suspension mode for the suspension system of a vehicle includes obtaining the user input from an interface control provided on a client device external to the vehicle.

6. The method as recited in claim 1, wherein obtaining user input regarding selection of a suspension mode for the suspension system of a vehicle includes obtaining the user input from a user profile.

7. The method as recited in claim 1 further comprising responsive to determining a suspension mode for the suspension system based on processing the user input and the plurality of sensor values for the values, validating the determined suspension mode.

8. The method as recited in claim 1, wherein the sensor values includes at least one of location or vehicle operational mode.

9. The method as recited in claim 1, determining a suspension mode for the suspension system based on processing the user input and the plurality of sensor values for the values includes determining a suspension mode based on associating a higher priority to a suspension mode determined by one or more sensor values.

10. The method as recited in claim 1 further comprising:
    obtaining at least one additional sensor value corresponding to one of a load or ground level; and
    causing a second modification to a subset of the four independent controllable portions of the suspension system based on the load or ground-level sensor value.

11. The method as recited in claim 1, wherein the determined suspension mode corresponds to a first mode and wherein determining a plurality of individual modification values to four independent controllable portions of the suspension system includes selecting a decrease in the position value of all four independent controllable portions to a threshold position value characterized as a lowest position.

12. The method as recited in claim 1, wherein the determined suspension mode corresponds to a second mode and wherein determining a plurality of individual modification values to four independent controllable portions of the suspension system includes:
    selecting a decrease in the position value of two independent controllable portions associated with a rear portion of the vehicle to a threshold position characterized as a lower position; and
    selecting an increase in the position value of two independent controllable portions associated with a front portion of the vehicle to a threshold position characterized as a higher position.

13. The method as recited in claim 1 further comprising causing implementation of one additional vehicle operation mode control responsive to the implementation of modification of the plurality of individual modifications to the four independent controllable portions.

14. The method as recited in claim 1, wherein validating the determined suspension mode comprises prohibiting a change in the determined suspension mode.

15. The method as recited in claim 1, wherein the obstruction comprises a curb or a rock.

16. The method as recited in claim 1, wherein the plurality of sensor values have a higher priority than the user input in determining a suspension mode for the suspension system.

17. A system for managing vehicle suspension systems comprising:

a user interface component for obtaining user input regarding selection of a suspension mode for the suspension system of a vehicle;

a vehicle interface for obtaining a plurality of sensor values for the vehicle, the sensor values associated with one or more of vehicle status and environmental measurements associated with the vehicle;

wherein the sensor values associated with environmental measurements comprise sensor values associated with presence of an obstruction;

a controller, implemented on a processor, the controller configured with computer-executable instructions configured to:

determine a plurality of individual modification values to four independent controllable portions of the suspension system responsive to processing the user input and the plurality of sensor values for the values, wherein each of the four independent controllable portions correspond to a wheel position of the vehicle and wherein each of the four independent controllable portions can raise or lower a portion of vehicle and are associated with a position value;

validate the determined plurality of individual modification values, wherein validating the determined plurality of individual modification values includes applying a rule processing to a sensor value associated with environmental measurements according to a determined suspension mode, wherein the determined suspension mode is different than the selected suspension mode; and cause implementation of modification of the plurality of individual modifications to the four independent controllable portions responsive to the determined modification values, wherein respective modifications to the four independent controllable portions individually modify the position value of the controllable portion.

18. The system as recited in claim 17, wherein obtaining user input regarding selection of a suspension mode for the suspension system of a vehicle includes obtaining the user input from at least one of an interface controls provided within the vehicle and an interface control provided on a client device external to the vehicle.

19. The system as recited in claim 17, wherein the controller is further operative to, in response to determining a suspension mode for the suspension system based on processing the user input and the plurality of sensor values for the values, validate the determined plurality of individual modification values.

20. The system as recited in claim 17, wherein the controller is further operative to:

obtain at least one additional sensor value corresponding to one of a load or ground level; and cause a second modification to a subset of the four independent controllable portions of the suspension system based on the load or ground-level sensor value.

21. A method for managing vehicle suspension systems comprising:

determining a suspension mode for the suspension system based on processing at user input and a plurality of sensor values, wherein the determined suspension mode is different than a suspension mode selected via the user input;

determining a plurality of individual modification values to four independent controllable portions of the suspension system based on the determined suspension mode, wherein each of the four independent controllable portions correspond to a wheel position of the vehicle and wherein each of the four independent controllable portions can raise or lower a portion of vehicle and are associated with a position value;

validating the determined suspension mode, wherein validating the determined suspension mode includes applying a rule processing to a sensor value associated with environmental measurements according to the determined suspension mode;

wherein the sensor values associated with environmental measurements comprise sensor values associated with presence of an obstruction; and causing implementation of modification of the plurality of individual modifications to the four independent controllable portions responsive to the determined modification values, wherein respective modifications to the four independent controllable portions individually modify the position value of the controllable portion.

22. The method as recited in claim 21 further comprising obtaining user input regarding selection of a suspension mode for the suspension system of a vehicle including obtaining the user input from at least one of an interface control provided within the vehicle and an interface control provided on a client device external to the vehicle.

23. The method as recited in claim 21 further comprising obtaining a plurality of sensor values for the vehicle, the sensor values associated with one or more of vehicle status and environmental measurements associated with the vehicle.

24. The method as recited in claim 21 further comprising responsive to determining a suspension mode for the suspension system based on processing the user input and the plurality of sensor values for the values, validating the determined suspension mode.

25. The method as recited in claim 21, determining a suspension mode for the suspension system based on processing the user input and the plurality of sensor values for the values includes determining a suspension mode based on associating a higher priority to a suspension mode determined by one or more sensor values.

26. The method as recited in claim 21 further comprising:

obtaining at least one additional sensor value corresponding to one of a load or ground level; and causing a second modification to a subset of the four independent controllable portions of the suspension system based on the load or ground-level sensor value.

27. The method as recited in claim 21, wherein validating the determined suspension mode comprises prohibiting a change in the determined suspension mode.

28. The method as recited in claim 21, wherein validating the determined suspension mode includes confirming the determined suspension mode via a user confirmation input.

* * * * *